(12) United States Patent
Persson

(10) Patent No.: US 7,637,098 B2
(45) Date of Patent: Dec. 29, 2009

(54) ARRANGEMENT FOR CONTROLLING EXHAUST PRESSURE PULSES AT AN INTERNAL COMBUSTION ENGINE

(75) Inventor: Per Persson, Partille (SE)

(73) Assignee: Volvo Lastvagnar AB, Gothenburg (SE)

( * ) Notice: Subject to any disclaimer, the term of this patent is extended or adjusted under 35 U.S.C. 154(b) by 430 days.

(21) Appl. No.: 11/571,524

(22) PCT Filed: Jul. 2, 2004

(86) PCT No.: PCT/SE2004/001094

§ 371 (c)(1),
(2), (4) Date: Jun. 22, 2007

(87) PCT Pub. No.: WO2006/004469

PCT Pub. Date: Jan. 12, 2006

(65) Prior Publication Data

US 2008/0110161 A1    May 15, 2008

(51) Int. Cl.
*F02B 27/02* (2006.01)
*F01N 3/00* (2006.01)
*F02M 25/06* (2006.01)

(52) U.S. Cl. .............. 60/295; 60/312; 60/313; 60/314; 60/279

(58) Field of Classification Search .......... 60/312, 60/313, 314, 279
See application file for complete search history.

(56) References Cited

FOREIGN PATENT DOCUMENTS

| DE | 19808873 A1 | 9/1999 |
|---|---|---|
| FR | 2841602 A1 | 1/2004 |
| GB | 2295647 A | 6/1996 |

OTHER PUBLICATIONS

International Search Report for corresponding International Application PCT/SE2004/001094.

*Primary Examiner*—Thomas E Denion
*Assistant Examiner*—Michael Carton
(74) *Attorney, Agent, or Firm*—WRB-IP LLP

(57) ABSTRACT

An arrangement for controlling exhaust pressure pulsation in a combustion engine including six cylinders. The engine also includes an inlet for supply of air to the cylinders, and an exhaust manifold for delivery of exhaust gases from the cylinders. The manifold is provided with a first outlet to an exhaust system and with a second outlet to a conduit for feeding exhaust gases back, via an EGR circuit, from at least one of the engine's cylinders to the inlet. At least one of the cylinders is adapted to enrich the exhaust gases with unburnt hydrocarbon with a view to regeneration of an exhaust gas post-treatment unit situated in the exhaust system. A special configuration of the exhaust manifold results in separation of regeneration gas from EGR gas in the exhaust manifold.

10 Claims, 3 Drawing Sheets

V5=Vport+Vg5
V6=Vport+Vg6+Vs2
Vg6~Vg5~Vg4

V4=Vport+Vg4
V6=Vport+Vg6+Vport+Vg5+Vs2
Vg6~Vg5~Vg4

ARRANGEMENT FOR CONTROLLING EXHAUST PRESSURE PULSES AT AN INTERNAL COMBUSTION ENGINE

BACKGROUND AND SUMMARY

The present invention relates to an arrangement for control of exhaust pressure pulsation of a combustion engine.

The diesel engine is known for operational reliability and low fuel consumption but does not produce as low emissions as, for example, a petrol engine provided with a three-way catalyst. One way of improving the emissions from a diesel engine is to fit a particle filter which filters soot and particles from the exhaust gases and/or the NOx post-treatment system. These filters are usually very effective and gather both large and small particles. To prevent the filter from becoming full of soot and causing a major pressure drop for the exhaust gases leaving the engine, the soot has to be burnt. One method is for this soot to be burnt by the nitrogen oxides contained in diesel exhaust gases. In that case, the portion of the nitrogen oxides that takes the form of $NO_2$ can oxidise the soot within the temperature interval of about 250 to 400° C., but this process takes a relatively long time and needs to be more or less constantly active even if there is an oxidation catalyst before the filter or the filter itself is covered with a catalytic layer. Another method for oxidising soot accumulated in the particle filter is to heat the filter to about 600-650° C. so that the surplus oxygen $O_2$ from diesel combustion can oxidise the soot directly, which is a rapid process. Soot accumulated over many hours of operating time can be oxidised away in a time of the order of 5 to 10 minutes. The exhaust temperature of a diesel engine normally never reaches 600-650° C., particularly after a turbo unit whereby the turbine extracts power from the exhaust flow and causes a temperature drop. It is not unusual that the exhaust temperature after the turbine of the turbo unit is often lower than 250° C., a temperature (tit which an oxidation catalyst does not function. There are various special measures for temporarily increasing the exhaust temperature of a diesel engine.

Regenerating a NOx trap or a NOx catalyst requires hydrocarbon, e.g. in the form of fuel which can for example be supplied by post-injection into one or more cylinders.

Some of the most modern diesel engines are often equipped with exhaust gas recirculation (EGR) to reduce emissions of nitrogen oxides. Combining this system with particle filters and/or NOx post-treatment by so-called NOx trap or NOx catalyst entails complications. When it is desired to adopt measures intended, for example, to increase the temperature of the exhaust flow, there is no point in increasing the exhaust temperature in the EGR flow, since it has to pass through the EGR cooler, whereupon the increased exhaust heat increases the load on the EGR cooler without being used in any positive way but resulting rather in the fuel consumption being somewhat increased due to the increase in the exhaust temperature. There are therefore gains to be made with regard to fuel consumption by channelling increased exhaust temperatures to the exhaust system but preventing this temperature increase in the exhaust gases being recirculated in the form of cooled EGR. A deliberate increase in the exhaust temperatures of the various cylinders can be achieved, for example, by ordinary combustion being delayed and/or post-injection being effected in such a way that the extra fuel added is burnt but only contributes to a small extent to the expansion work in the cylinders.

The temperature of the exhaust flow before the particle filter can be increased to 600-650° C. by oxidising (burning) fuel in the oxidation catalyst fitted before the filter. This fuel can be injected in the exhaust line just before the catalyst, or extra injection can be effected in the cylinder, but within a crankshaft angle interval in which the conditions for the fuel to ignite in the cylinder are not fulfilled. This is for example the case when the fuel is injected into the cylinder during the latter part of the expansion stroke or during the exhaust stroke, so-called late post-injection. If the fuel is injected into the cylinder, the same injection equipment can preferably be used as for the ordinary fuel injection. This avoids the cost and complications of a further extra injector for the fuel which is to be oxidised in the oxidation catalyst. If the extra fuel is supplied by late post-injection in all the cylinders and the engine at the same time uses feedback of exhaust gases to the inlet (EGR), this means that part of the unburnt fuel intended for the catalyst reaches the EGR circuit and the inlet ducts. Any fuel vaporised when leaving the cylinders during the exhaust stroke but later cooled in an EGR cooler can be condensed and part of the resulting liquid may possibly accumulate in recesses/pockets during certain modes of operation. When the engine's operating mode subsequently changes and the gas flow changes, the liquid accumulated may possibly accompany the gas flow momentarily and immediately enter one or more cylinders in an uncontrolled manner. This gives rise to uncontrolled behaviour of the engine and may cause serious accidents and/or damage. Fuel which does not condense but passes through the EGR cooler and the inlet ducts in a vaporised form also gives rise to altered combustion conditions. In a diesel engine, the fuel should in fact not arrive at the same time as the inlet air, as the fuel supply timing should be determined by the injection system. Even a small leak in the EGR circuit may become very obvious if condensed fuel begins to trickle out through the leak.

These adverse effects due to fuel in the EGR circuit can be prevented either by closing the EGR circuit when late post-injection takes place, or alternatively, as a consequence of the NOx level increasing from the combustion, applying late post-combustion only in carefully selected cylinders in combination with designing the exhaust manifold in such a way that EGR gases are only taken from cylinders which have no late post-injection. U.S. Pat. No. 5,987,884 and U.S. Pat. No. 6,141,959 describe how an exhaust system divided into two portions, combined with late post-injection in certain designated cylinders, to avoid the above problems caused by fuel in the EGR circuit. The method of dividing an exhaust system into two portions usually means that the exhaust system is more expensive to manufacture and requires more space for installing it.

It is desirable to provide an arrangement in a combustion engine which avoids the effects on the flow in the EGR circuit which are caused by means for regeneration of an exhaust post-treatment unit situated in the exhaust system even in the case of exhaust systems in which all the exhaust gases are collected in one and the same duct entirely outside the exhaust ports of each cylinder. It is also desirable to provide uniform pressure pulses at both the exhaust outlet of the exhaust manifold and its EGR outlet.

BRIEF DESCRIPTION OF THE DRAWINGS

The arrangement according to the invention is described below in more detail with reference to examples of embodiments depicted in the attached drawings, in which FIG. 1 schematically depicts a combustion engine with an EGR circuit and a regenerable exhaust post-treatment unit according to the invention, FIG. 2 schematically depicts an exhaust manifold according to a first embodiment of the invention, FIG. 3 in a corresponding manner depicts an exhaust manifold according to a second embodiment of the exhaust manifold.

DETAILED DESCRIPTION

Figure 1:
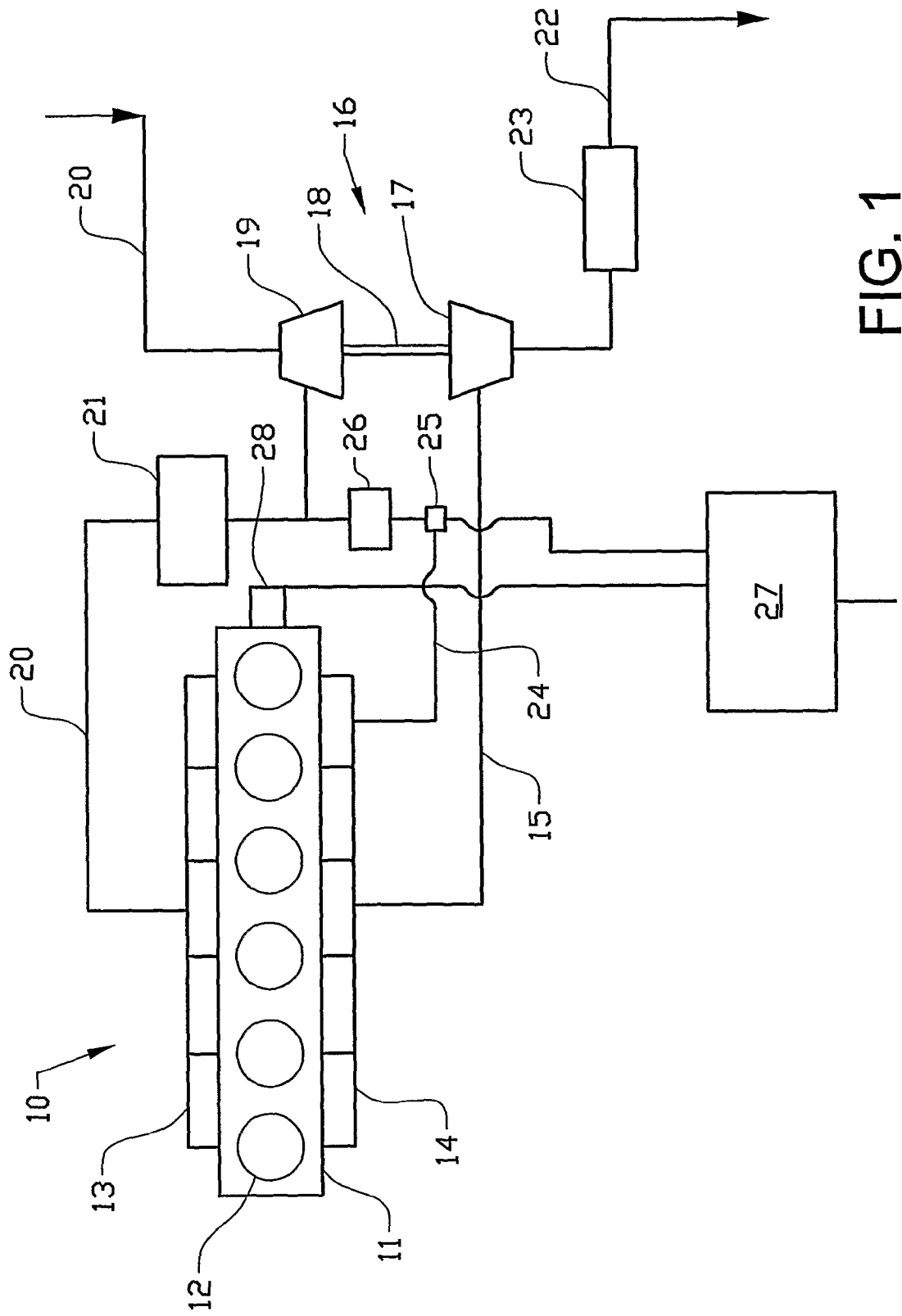

The combustion engine 10 schematically depicted in FIG. 1 comprises an engine block 11 with six piston-cylinders 12 with an inlet manifold 13 and an exhaust manifold 14. Exhaust gases are led via an exhaust passage 15 to the turbine wheel 17 of a turbo unit 16. The turbine shaft 18 drives the compressor wheel 19 of the turbo unit that compresses air coming in via an inlet passage 20 and passes it on via a charge air cooler 21 to the inlet manifold 13. Fuel is supplied to the respective cylinders 12 via (undepicted) injection devices.

Exhaust gases which have passed through the turbine unit 16 are led to the atmosphere via the exhaust line 22, which leads the exhaust gases through a regenerable device for exhaust post-treatment, e.g. a particle trap or NOx trap 23. Regeneration of the particle trap is effected by supply of unburnt fuel from any of the cylinders 12, e.g. by so-called "post-injection", which by oxidation of the fuel in the catalyst upstream from the particle filter raises the temperature in the particle trap sufficiently for soot in the latter to ignite and burn away.

Exhaust gases are also led back to the inlet side of the engine via a conduit 24 as so-called EGR gas, in order to reduce the discharge of nitrogen oxides from the engine by known technology. This line comprises a valve 25 serving both as a one-way valve and as a control valve for regulating the EGR flow. There is also a cooler 26 for cooling the EGR gases.

The valve 25 is connected to an engine control unit 27 comprising control programmes and control data for controlling the engine on the basis of input data. The engine control unit 27 is for example connected to a sensor 28 that detects engine speed.

Here below follows a description of how admission of unburnt fuel to the EGR circuit is prevented despite the exhaust system not being divided into two separate portions and despite all the exhaust gases being collected in one and the same duct entirely outside the exhaust ports of each cylinder. The presupposition is a six-cylinder engine with conventional ignition sequence of 1-5-3-6-2-4. This also applies to a so-called V6 engine comprising a cylinder bank of three cylinders on one side of the middle of the Engine and a cylinder bank of three cylinders on the other side of the middle of the engine, the two cylinder banks being connected by exhaust manifolds.

The ignition sequence which applies for a usual straight six-cylinder engine results in the exhaust pulses of the various cylinders coming alternately from the forward engine half (cylinders 1, 2, 3) and the rear engine half (cylinders 4, 5, 6). With a V6 configuration, the exhaust pulses come alternately from the left bank of cylinders and the right bank of cylinders.

In the exhaust manifold of a six-cylinder engine provided with a turbo unit with variable turbine geometry (VTG), the exhaust gases are most commonly led together from all six cylinders, since a VTG turbine usually has no dividing wall. A turbo unit for a six-cylinder engine with fixed turbine often has a dividing wall, in which case it is combined with an exhaust manifold which separates the gases in such a way that alternate exhaust pulses take place in one half and the other exhaust pulses in the other half. However, this type of separated exhaust pulse arrangement is not employed in combination with a turbine that has no dividing wall, e.g. a VTG turbine.

An exhaust manifold which collects the exhaust gases from all six cylinders without any dividing wall to separate alternate exhaust pulses may be provided with EGR outlet at an outer end of the extent of the engine, and the turbine extraction may be situated preferably at the other end of the extent of the exhaust manifold. For such an exhaust manifold, the pressure pulses may remain six approximately equal pressure pulses irrespective of whether one end is tapped by an outlet for EGR, even for EGR flows of the order of 10% to 50% (mass flow$_{EGR}$/[mass flow$_{EGR}$+mass flow$_{exhaust}$])—If such an exhaust manifold separates the exhaust flows from the two halves (forward/rear) of the engine while EGR is tapped from only one half, the result is limping pressure pulsation, i.e. pressure pulses significantly stronger in the half which supplies only the turbine with exhaust gases than the pressure pulses prevailing in the half which supplies gas flow to both the EGR circuit and the turbine.

Limping pressure pulsation is less advantageous for the turbine, with the result that the turbine operates in a working range of lower efficiency. Such separation causes the EGR circuit to receive only three exhaust pulses in two complete engine revolutions (a Whole four-stroke working cycle), which is disadvantageous as compared with six smaller pulses, since, when the exhaust gases require mixing with fresh air before the gases fed back are led into the engine's inlet pipe, the gas mixture needs to be as homogeneous as possible both spatially and chronologically (a sparse pulsated flow results in EGR content variations as a function of crankshaft angle, causing the six different cylinders to be filled with gas from the inlet box with an EGR content which varies depending on whether the EGR flow is added to the fresh air by three or six pulses during a complete working cycle (two engine revolutions). In other words, it is advantageous for both the turbine and the EGR function when there are six equal pulses rather than limping pulsation. These six equal pulses are preferably provided by the exhaust flow from the six different cylinders being led together without any long pipes and without dividing walls separating the exhaust flows from the various cylinders.

An example is described below of how an exhaust manifold meets all the above requirements so as to avoid adding unburnt fuel from late post-injections and/or deliberately heated exhaust gases to the EGR circuit, and at the same time so as to provide six approximately equal pressure pulses for the turbine and EGR outlets on the exhaust manifold.

Figure 2:
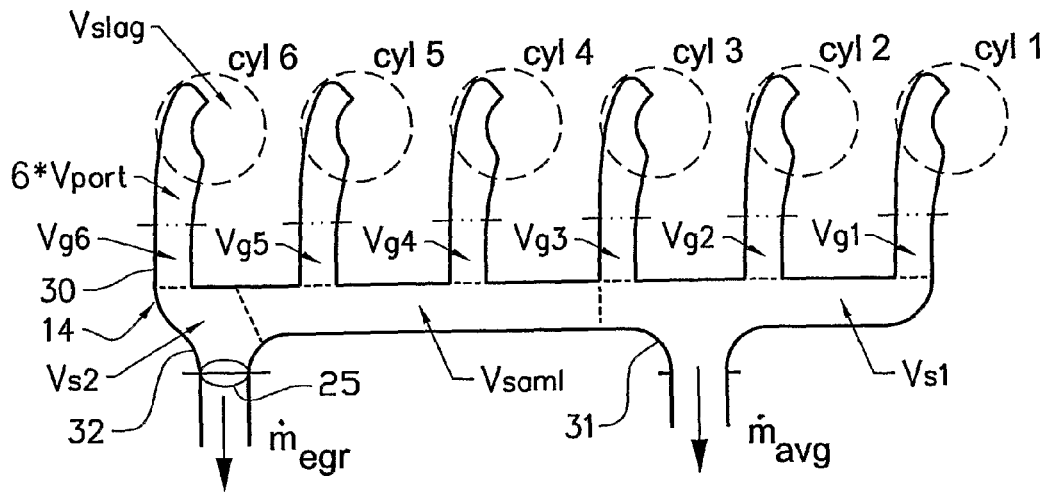
Figure 3:
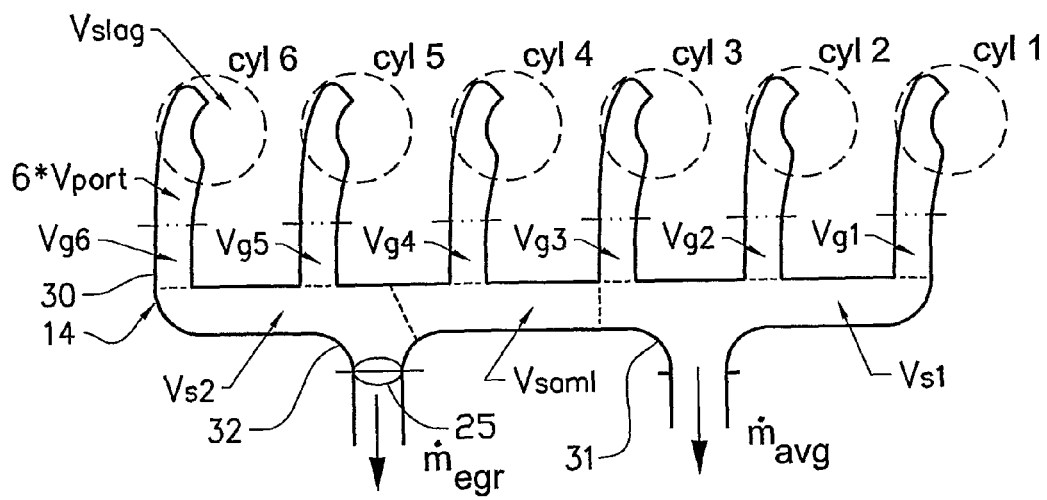
Figure 4:
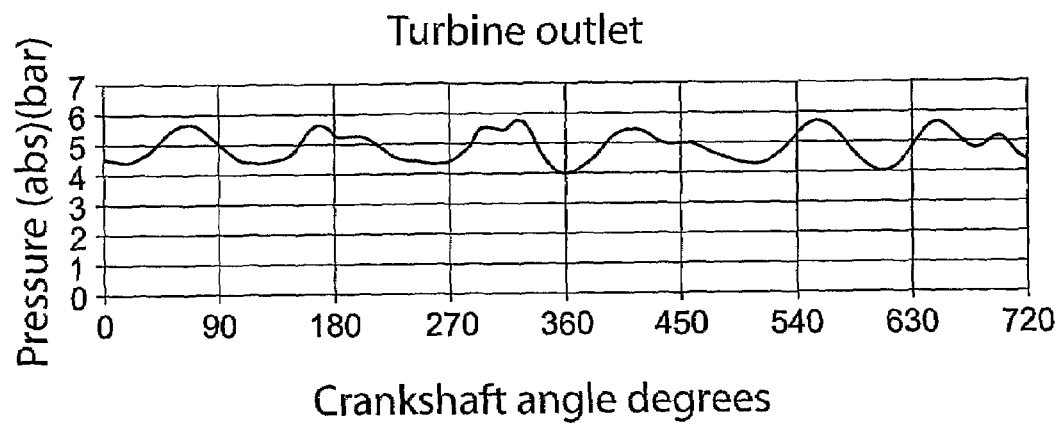
FIG. 4 is a diagram representing the pressure at the turbine outlet of the exhaust manifold.

FIGS. 2 and 3 schematically depict two different examples of embodiments of an exhaust manifold 14 with definitions of the partial volumes used in the equations set out below. Thus $V_{slag}$ denotes the swept volume of each of the cylinders 12. $V_{port}$ denotes the volume of the respective exhaust port in the cylinder head 29 up to the individual branch 30 of the exhaust manifold. $V_g$ denotes the volume of the individual branches 30 up to the common portion of the manifold 14. This common portion of the manifold 14 is itself divided into a first collective subvolume $V_{s1}$ which connects both to three of said branch volumes $V_g$ situated on one side of the exhaust manifold and to the outlet 31 to the exhaust system, a second collective subvolume $V_{s2}$ which connects both to at least one of the other branch volumes $V_g$ and to the outlet 32 to the EGR circuit, and a third collective subvolume $V_{sam1}$ which both connects to the remaining branch volumes and links the first and second collective subvolumes $V_{s1}$, $V_{s2}$. The mass flow through the outlet 31 to the exhaust system is denoted as $m_{avg}$, and the mass flow through the outlet 32 as $m_{egr}$.

The arrangement according to the invention is based on calculations of cylinder production of exhaust flow at the six different inlets (from the respective cylinders) and the two different outlets on the exhaust manifold, calculations which entail advanced CFD (computational fluid dynamics) simulations involving the geometry of the exhaust manifold and the flow and pressure pattern during a whole working cycle of the engine, i.e. two revolutions. These advanced simulations cannot be reproduced in detail for every conceivable possible exhaust manifold configuration, so what is disclosed below is merely a greatly simplified approximate representation, in the form of two equations (1) and (2) for how various exhaust manifold subvolumes, EGR contents and pressure pulses relate to one another with a view to fulfilling the condition of preventing the addition of unburnt fuel (late post-injection intended for post-treatment systems) from one or more of the three cylinders 1 to 3 in one half of a six-cylinder engine, or with a view to deliberately ensure that increased exhaust temperature from one or more of the cylinders in that group reaches only the turbine (the post-treatment system) and not the EGR cooler. The EGR circuit is connected to the manifold in the vicinity of cylinder 5 or 6 at the other end of the engine.

The presuppositions are that $m_{egr}/(m_{egr}+m_{avg})$

When any of cylinders 4, 5 or 6 produces an exhaust pulse, the EGR circuit is regarded as being supplied with gas from any of these three cylinders. For the EGR circuit not to be supplied with gas from cylinders 1, 2 or 3 when they produce their exhaust pulse, equations (1) and (2) need to be fulfilled $$\frac{(V_{sam1} + V_5/2 + V_6)}{V_{slag}} - \frac{m_{egr} \cdot (1 + p_{max}/p_{min})}{(m_{egr} + m_{avg}) \cdot 4} > \frac{p_{max}}{p_{min}} \cdot \frac{(V_5/2 + V_6)}{V_{slag}} \quad (1)$$

$$\frac{V_{sam1}}{V_{slag}} > \frac{m_{egr}}{m_{egr} + m_{avg}} \quad (2)$$

Figure 5:
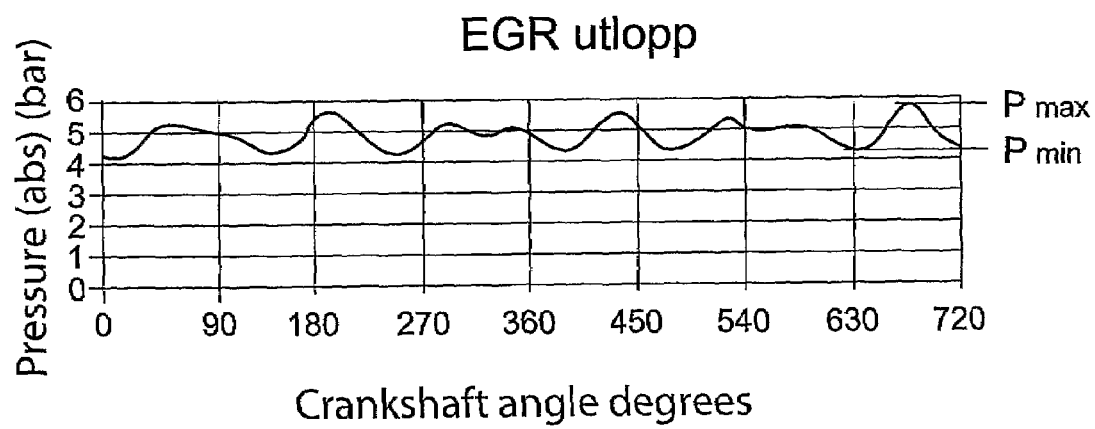
FIG. 5 is a diagram representing the pressure at the outlet of the exhaust manifold to the EGR circuit.

Equation (1) refers to the situation at a pressure dip immediately after a pressure peak (see diagram in FIG. 5) caused by an exhaust pulse from cylinder 4, 5 or 6. Moreover, the amount of gas in subvolumes $V_{sam1}$, $V_6$ and $V_5/2$ during a pressure dip $$P_{min} \cdot (V_{sam1} + V_5/2 + V_6) \quad (1a)$$

is assumed to be sufficient to provide the EGR circuit with EGR gas $$\frac{m_{egr} \cdot V_{slag} \cdot (P_{min} + P_{max})}{(m_{egr} + m_{avg}) \cdot 2 \cdot 2} \quad (1b)$$

from the pressure dip to the next pressure peak. At this pressure peak caused by an exhaust pulse from cylinder 1, 2 or 3, the amount of gas $$P_{max}(V_5/2 + V_6) \quad (1c)$$

has to be a partial amount of the gas in (1a).

In equations (1a) and (1c), volume $V_4$ is omitted, since it may be regarded as partly filled with gas from cylinders 1 to 3 during future pressure rises due to exhaust pulses from cylinders 1 to 3, while volume $V_5$ is divided by two since only to a small extent will it be filled with gas from cylinders 1 to 3 during future pressure rises due to exhaust pulses from cylinders 1 to 3.

From the bottom of the pressure graph to the top of the pressure graph, the EGR circuit is regarded as consuming EGR according to (Ib):

$$\frac{m_{egr} \cdot V_{slag} \cdot (P_{min} + P_{max})}{(m_{egr} + m_{avg}) \cdot 2 \cdot 2}$$

where the first division by two is due to half a pressure pulse (one-twelfth of a whole working cycle) and the second division by two is due to averaging of the two pressure levels $p_{min}$ and $p_{max}$.

After shortening by $p_{min}$ and $V_{slag}$, the result is (1a)–(1b) >(1c), from which the dimensionless equation (1) is derived.

Equation 2 is intended to compare the situation at a pressure low after an exhaust pulse from cylinder 4, 5 or 6 with the situation at a pressure low after an exhaust pulse from cylinder 1, 2 or 3.

Before an exhaust pulse from any of cylinders 1-3, the amount of gas in (2a):

$$P_{min} \cdot V_{sam1}$$

has to be greater than the amount tapped by the EGR circuit during one pulse (one-sixth of a working cycle) according to (2b)

$$V_{slag} \cdot p_{min} \cdot \frac{m_{egr}}{m_{egr} + m_{avg}}$$

After shorting by $V_{slag}$ and $p_{min}$, the result is therefore (2a)>(2b), from which the 15 dimensionless equation (2) is derived.

The cylinder numbering used above of 1 to 6 from front to rear may of course be reversed, or the exhaust manifold 14 may be reversed so that the outlet for EGR is situated at the front end of the engine and the turbine outlet at the rear end of the engine (mirror reversal). Cylinders 1-3 may be the cylinders on one side (bank) of a V6 engine and cylinders 4-6 may be those on the other side (bank) of a V6 engine.

If the EGR outlet is relocated to a position between the fourth and fifth exhaust branches according to FIG. 3, equation (1) is modified to equation (3).

In the case of an exhaust manifold configured according to FIG. 3, the equation (3) set out below, in combination with equation (2), governs how the various exhaust 25 manifold subvolumes, EGR contents and pressure pulses relate to one another with a View to fulfilling the condition of preventing the addition of unburnt fuel (late post-injection intended for an aftertreatment system) from one or more of the three cylinders 1 to 3 in one half of a six-cylinder engine, or with a view to ensuring that the intended increased exhaust gas temperature from one or more of cylinders one to three reaches only the turbine (the aftertreatment system) and not the EGR cooler.

$$\frac{(V_{sam1} + V_4/2 + V_6)}{V_{slag}} - \frac{m_{egr} \cdot (1 + p_{max}/p_{min})}{(m_{egr} + m_{avg}) \cdot 4} > \frac{p_{max}}{p_{min}} \cdot \frac{(V_4/2 + V_6)}{V_{slag}} \quad (3)$$

CFD calculations with an engine arrangement according to the invention corresponding to FIG. 2 result in the following proportional relationships between the exhaust gases at the turbine outlet 31 and the EGR outlet 32 respectively:

from cylinder 6: 19.2% turbine outlet, 80.8% EGR outlet
from cylinder 5: 34.8% turbine outlet, 65.2% EGR outlet
from cylinder 4: 45.8% turbine outlet, 54.2% EGR outlet
from cylinder 3: 99.7% turbine outlet, 0.3% EGR outlet
from cylinder 2: 99.6% turbine outlet, 0.4% EGR outlet
from cylinder 1: 99.0% turbine outlet, 1.0% EGR outlet Consequently the EGR outlet 32 does not receive more than, at most, about 1% of the exhaust gases from cylinders 1 to 3, which can therefore be used in the regeneration of, for example, a particle filter 23, for supply of unburnt fuel by post-injection via existing injectors.

The invention is not to be regarded as limited to the embodiment examples described above, instead a number of further variants and modifications are conceivable within the scopes of the claims set out below.

The invention claimed is:

1. An arrangement for controlling exhaust pressure pulsation of a combustion engine comprising
an engine comprising six cylinders, an inlet for supply of air to the cylinders, and an exhaust manifold for delivery of exhaust gases from the cylinders, the arrangement comprising
a first outlet to an exhaust system and
a second outlet to a conduit (24) for feeding exhaust gases back, via an EGR circuit, from at least one of the cylinders of the engine to the inlet at least one of the cylinders being arranged for addition of means for regeneration of an exhaust gas aftertreatment unit situated in the exhaust system, the exhaust manifold comprising branch volumes each appurtenant to a respective cylinder port, a first collective subvolume connecting both to three of the branch volumes situated on one side of the exhaust manifold and to the first outlet to the exhaust system, a second collective subvolume connecting both to at least one of the other branch volumes and to the second outlet to the EGR circuit, and a third collective subvolume which both connects to remaining branch volumes and links the first and second collective subvolumes, wherein a mutual relationship between a swept volume of the cylinders, the exhaust manifold volume and the third collective subvolume, the ratio of mass flow of EGR to the mass flow of exhaust gases and the ratio between pressure maximum and pressure minimum in a pulsating exhaust flow, are such that EGR gas is separated from regeneration gas in the exhaust manifold.

2. An arrangement according to claim 1, wherein means for regeneration of an exhaust aftertreatment unit situated in the exhaust system comprises unburnt hydrocarbon added in the cylinder after normal combustion.

3. An arrangement according to claim 1, wherein means for regeneration of an exhaust post-treatment unit comprises one of deferred combustion and, after normal combustion, addition of burnt hydrocarbon to increase exhaust temperature.

4. An arrangement according to any claim 1, wherein the exhaust aftertreatment unit comprises a particle trap.

5. An arrangement according to claim 3, wherein the exhaust post-treatment unit comprises a NOx trap/NOx catalyst.

6. An arrangement according to claim 1, wherein the exhaust system comprises at least one turbo unit comprising a turbine for absorbing energy from the exhaust gases and a compressor for compression of air supplied to the inlet of the engine.

7. An arrangement according to claim 1, wherein the engine is a straight six-cylinder engine.

8. An arrangement according to claim 1, wherein the engine is a V6 engine.

9. An arrangement according to claim 1, wherein the second collective subvolume connects to one of the other branch volumes.

10. An arrangement according to claim 1, wherein the second collective subvolume connects to two of the other branch volumes.

* * * * *